United States Patent
Delorenzi et al.

(10) Patent No.: US 9,549,153 B1
(45) Date of Patent: Jan. 17, 2017

(54) METHOD AND APPARATUS FOR FACILITATING SETUP, DISCOVERY OF CAPABILITES AND INTERACTION OF ELECTRONIC DEVICES

(71) Applicant: Logitech Europe S.A, Lausanne (CH)

(72) Inventors: Stephane Delorenzi, Lausanne (CH); Olivier Gay, Lausanne (CH); Mathieu Meisser, Lutry (CH); Thomas Luc Rouvinez, Evionnaz (CH); Nicolas Sasselli, Belmont-sur-Lausanne (CH); Remy Zimmermann, Pully (CH)

(73) Assignee: LOGITECH EUROPE, S.A., Lausanne (CH)

( * ) Notice: Subject to any disclaimer, the term of this patent is extended or adjusted under 35 U.S.C. 154(b) by 0 days.

(21) Appl. No.: 15/166,113

(22) Filed: May 26, 2016

(51) Int. Cl.
H04N 7/15 (2006.01)
H04W 4/06 (2009.01)

(52) U.S. Cl.
CPC ........ *H04N 7/15* (2013.01); *H04W 4/06* (2013.01)

(58) Field of Classification Search
USPC ....................................................... 348/14.02
See application file for complete search history.

(56) References Cited

U.S. PATENT DOCUMENTS

| 7,298,733 B2 * | 11/2007 | Sakai | H04L 41/00 370/352 |
| 7,876,923 B2 | 1/2011 | Finnegan et al. | |
| 2013/0183958 A1 * | 7/2013 | Wesby | G06Q 40/00 455/420 |
| 2014/0313282 A1 | 10/2014 | Ma et al. | |

* cited by examiner

*Primary Examiner* — Creighton Smith
(74) *Attorney, Agent, or Firm* — Patterson & Sheridan, LLP.

(57) ABSTRACT

Embodiments of the disclosure provided herein generally include a system and a method of configuring and/or controlling one or more electronic devices using a portable electronic device based on the interaction of the portable electronic device with a beacon signal generating system that is disposed at a desired location. Embodiments of the disclosure may include a system and a method of collecting and analyzing useful information received by the portable electronic device based on the receipt of a beacon signal. The portable electronic device may then perform one or more desirable functions or processes based the portable electronic device's interaction with the beacon signal generating system. Some aspects of the invention may include an apparatus, method and/or one or more computing device software applications that are configured to more easily setup, configure and/or reliably control an additional electronic device based on the interaction of the portable electronic device with the beacon signal generating system.

19 Claims, 3 Drawing Sheets

METHOD AND APPARATUS FOR FACILITATING SETUP, DISCOVERY OF CAPABILITES AND INTERACTION OF ELECTRONIC DEVICES

BACKGROUND OF THE INVENTION

Field of the Invention

Embodiments disclosed herein generally relate to methods and electronic devices used to enable the configuration and/or control of one or more electronic devices using a separate electronic device.

Description of the Related Art

The popularity of portable electronics, such as smartphones, touch pads, PDAs, portable computers and portable music players, has increased dramatically in the past decade. As the number of electronic devices and the reliance on these electronic devices has increased, a need for these devices to interact and interface with each other has increased. One issue with the large increase in the use of electronic devices has been the complexity of the setup of these devices so that they can seamlessly provide the user with useful information and easily communicate with each other without taking a large amount of the user's time to set up.

Video conferencing has also become more popular in recent years, thanks in large part to proliferation of high speed Internet and price reductions in camera equipment. For example, dedicated video conferencing locations exist where rooms and technological resources are dedicated solely to the task of video conferencing. Typically, video conferencing locations include fixed video conferencing hardware that include multiple camera devices and one or more video servers that are capable of controlling the transfer of video conferencing data between the various video conferencing sites.

While video conferencing technology is rapidly improving, it remains challenging to provide sophisticated video conferencing systems that can be easily set up so that they can rapidly and easily interact and transmit information electronically between multiple users at many different locations. While dedicated video conferencing environments provide many sophisticated features, such functionality currently comes at a substantial cost and complexity, in large part due to these sophisticated setups requiring many different types of computer hardware that must interact with each other.

Therefore, there is need for methods and electronic devices that can be used to rapidly and easily setup, configure and/or control one or more electronic devices. There is also a need for a method and electronic device that will automatically and seamlessly provide desirable information to the user. There is also a need for a software application and a control method that allows a portable electronic device to easily setup and/or one or more electronic devices, such as video conferencing system hardware, audio devices, computing devices, home automation devices or other similar electronic devices.

SUMMARY OF THE INVENTION

Embodiments disclosed herein generally include a computer implemented method, comprising receiving a first beacon signal, wirelessly transmitting beacon information to a back-end server via a first communication link, wherein the beacon information is derived from an analysis of the received first beacon signal. Next, receiving operational information from the back-end server via the first communication link, wherein the operational information is derived from information contained within the wirelessly transmitted beacon information, and then analyzing the received operational information. Next, wirelessly transmitting auxiliary device control information to an auxiliary electronic device, wherein the auxiliary device control information comprises one or more command instructions that were derived from the analysis of the received operational information, and wherein wirelessly transmitting the auxiliary device control information causes the auxiliary electronic device to initiate a task that relates to the auxiliary electronic device's primary control function. The initiated task performed by the auxiliary electronic device may also include automatically joining a video conference using a second communication link that is different from the first communication link. The initiated task performed by the auxiliary electronic device may also include an initiation of communication with an external video conferencing system.

Embodiments disclosed herein may further provide an electronic device, comprising a processor, a transceiver that is configured to receive a beacon signal that is wirelessly transmitted from a beacon signal generating device and non-volatile memory. The non-volatile memory having event information stored therein and a number of instructions which, when executed by the processor, causes the portable electronic device to perform operations comprising analyzing the received beacon signal, wirelessly transmitting beacon information to a back-end server via a first communication link, wherein the beacon information is derived from the analysis of the beacon signal, analyzing operational information wirelessly received from the back-end server via the first communication link, wherein the operational information is derived from information contained within the wirelessly transmitted beacon information, wirelessly transmitting auxiliary device control information to an auxiliary electronic device, wherein wirelessly transmitting the auxiliary device control information causes the auxiliary electronic device to initiate a task that relates to the auxiliary electronic device's primary control function.

Embodiments disclosed herein may further provide an electronic device, comprising a device processor, a sensor that is configured to receive a beacon signal, and a non-volatile memory having event information stored therein and a number of instructions which, when executed by the device processor, causes the portable electronic device to perform operations comprising analyzing the received beacon signal, transmitting beacon information to a back-end server via a first communication link, wherein the beacon information is derived from the analysis of the beacon signal, analyzing operational information received from the back-end server via the first communication link, wherein the operational information is derived from information contained within the transmitted beacon information, and transmitting auxiliary device control information to an auxiliary electronic device. The auxiliary electronic device may comprise an auxiliary processor, and a non-volatile memory having a number of instructions which, when executed by the auxiliary processor, causes the auxiliary electronic device to perform operations comprising initiating a task based on the received auxiliary device control information, wherein the initiated task includes an initiation of communication with an external video conferencing system.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

Figure 1:
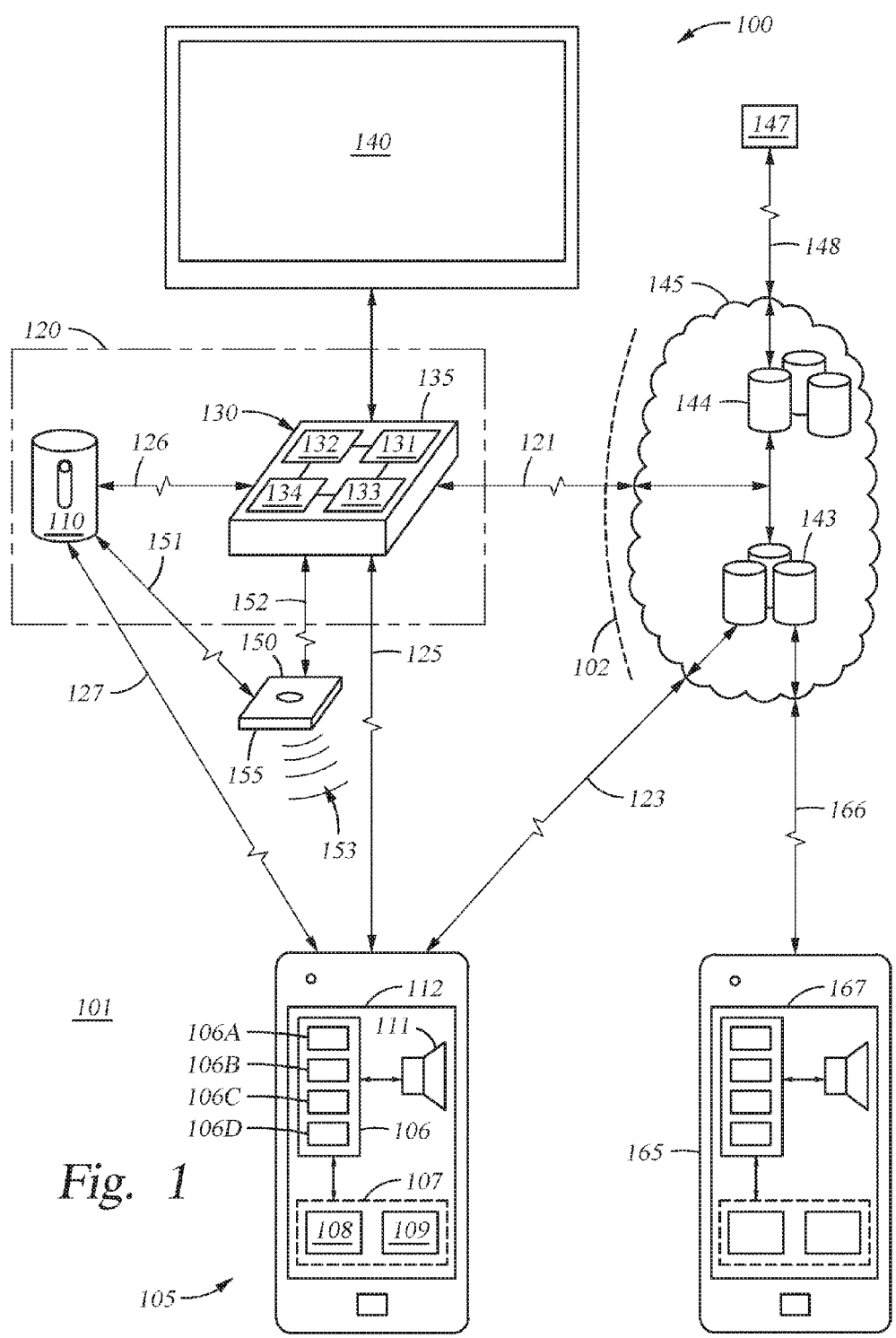
FIG. 1 illustrates an electronic system that includes multiple electronic devices that are interconnected using various communication links, according to one embodiment of the present disclosure.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Embodiments of the disclosure provided herein generally include a system and a method of configuring and/or controlling one or more electronic devices using a portable electronic device based on the interaction of the portable electronic device with a beacon signal generating system that is disposed at a desired location. Embodiments of the disclosure may include a system and a method of collecting and analyzing useful information received by the portable electronic device based on the receipt of a beacon signal. The portable electronic device may then perform one or more desirable functions or processes based the portable electronic device's interaction with the beacon signal generating system. Some aspects of the invention may include an apparatus, method and/or one or more computing device software applications that are configured to more easily setup, configure and/or control an additional electronic device, or also referred to herein as an auxiliary electronic device, based on the interaction of the portable electronic device with the beacon signal generating system.

In some embodiments, the apparatus and methods include a beacon signal generating system that can provide information to the portable electronic device about the device the beacon signal generating system is associated with, the environment that the beacon signal generating system has been positioned within or the beacon signal generating system itself. In one example, a first beacon signal generating system is positioned within a conference room, and is adapted to cause the software application(s) running on a portable electronic device that is brought within the conference room to setup and/or control a conference room dedicated video conferencing system (e.g., fixed video conferencing device) positioned within the conference room. The setup and/or control a conference room dedicated video conferencing system may be based on the interaction of the portable electronic device with the beacon signal generating system. While, in this example, if the same portable electronic device is caused to interact with a second beacon signal generating system, which is also positioned within the conference room, it may initiate and cause the setup and/or control of a different auxiliary electronic device. In one example, the interaction with the second beacon signal generating system may initiate the control and transmission of electronic data from an electronic whiteboard, which can then be viewed by others that have remotely joined a video conference due to the initial interaction of the portable electronic device with the first beacon generating signal system.

FIG. 1 is a schematic diagram that illustrates an electronic system 100 that is disposed within an environment 101, and includes at least one beacon signal generating system 150 that is configured to interact with an electronic device, such as a portable electronic device 105. In general, the beacon signal generating system 150 is an electronic device that is used in conjunction with one or more portable electronic devices 105. The beacon signal generating system 150 is generally able to communicate with the portable electronic device 105 using a communication link 153. In some embodiments, the communication link 153 is a one-way communication path in which a transceiver 155 within the beacon signal generating system 150 is used to transfer beacon information contained within a beacon signal to the portable electronic devices 105. In some configurations, the communication link 153 is a wireless communication path that is enabled by the transmission of a communication signal from the transceiver 155, such as the transmission of a radio signal, infrared signal, ultrasonic signal or other similar communication signal transfer method. Other communication signal transfer methods that may be used include, but are not limited to, Bluetooth (BT), Bluetooth LE, Infrastructure Wireless Fidelity (WiFi), Soft Access Point (AP), WiFi-Direct, and NFC communication methods.

In some embodiments, the electronic system 100 may include the beacon signal generating system 150 and an auxiliary electronic device that the beacon signal generating system 150 is associated with by physical proximity and/or by some form of communication link. In one example, as discussed further below, the electronic system 100 includes a beacon signal generating system 150 that is associated with the auxiliary electronic device that is a video conferencing system 120. The video conferencing system 120 may include a video conferencing controller 130 and one or more video conferencing devices 110. In this example, the transceiver 155 of beacon signal generating system 150 is in electrical communication with at least one component found within the video conferencing system 120 via a wired or wireless communication link. In one configuration, the transceiver 155 is in wired or wireless communication with a video conferencing device 110 by way of a communication link 151. The transceiver 155 may additionally or alternately be in wired or wireless communication with a transceiver within the video conferencing controller 130 by way of a communication link 152. In some embodiments, the beacon signal generating system 150 is part of a component, such as the video conferencing controller 130 or a video conferencing device 110, within the auxiliary electronic device.

In general, the one or more video conferencing devices 110 may be in communication with the video conferencing controller 130 via a wired or wireless communication link 126. The video conferencing controller 130 may be in communication with one or more electrical devices that are positioned and configured to enable the formation of a video conference with other external resources via one or more internet devices positioned on the internet 145 using a communication link 121. Typically, to avoid the loss of sensitive data, the communication link 121 requires information sent to or coming from the video conferencing controller 130 to pass through a firewall 102, which is designed to block unauthorized incoming access while permitting outward communication to one or more of the internet devices. In some cases the communication link 121 may support the transmission of video conference feeds that include audio and video streams, which require the communication link 121 to be formed on a high performance network that is connected to a Local Area Network (LAN) present in each video conference location and/or across multiple video conference locations on a Wide Area Network (WAN). The video conferencing controller 130 may be any form of conventional electronic computing device, which may include a processing system 135. The processing system 135 will typically include memory 133, input/output (I/O) devices 132, and a processor 134, which may include a central processing unit (CPU), a digital signal processor (DSP), and/or application-specific integrated circuits (ASIC), and other useful components. The input/output (I/O) devices 132 typically includes one or more transceivers that are configured to establish wired or wireless communication links, such as the communication links 123, 125 and 127, with other transceivers residing within other computing devices. The memory 133 may include conventional non-volatile memory that has one or more software applications or software programs (not shown) stored therein. In some configurations, one or more of the video conferencing devices 110 may include a video camera device that includes a CCD camera, a keyboard that is coupled to the video conferencing controller 130, a speaker phone, speaker, or other electronic device that is useful for video conferencing. In one example, one or more of the video conferencing devices 110 may be an Ultimate Ears Boom™ speaker, a Harmony™ universal remote control or a Logitech Connect™ or a Logitech BCC 950™ video conferencing device that are all available from Logitech USA of Newark Calif. or Logitech Europe S.A of Lausanne, Switzerland.

As is discussed further below, the portable electronic device 105 will generally use a received beacon signal to determine, by use of one or more software applications found within the portable electronic device 105, what desired activities the portable electronic device 105 will subsequently perform. The information provided from the beacon signal generating system 150, or beacon information, may contain beacon signal generating system identification information, beacon signal generating system configuration information, configuration information about the auxiliary electronic device (e.g., video conferencing system 120) that is associated with the beacon signal generating system, information about the beacon signal generating system environment or other types of device or physical position identifying information. The beacon information can be stored within memory found within the beacon signal generating system 150, and transferred from the beacon signal generating system 150 by way of the transceiver 155. Thus, in some embodiments, the portable electronic device 105 need not contain hardware that is specially configured to interact with the beacon signal generating system 150, but only requires that the portable electronic device 105 be enabled to communicate with the beacon signal generating system 150 and have one or more preloaded software applications running on the portable electronic device 105 that are adapted to perform the one or more desired activities based on the information received in beacon signal.

The beacon signal generating system 150 may be any technically feasible electronic device configured to interact with one or more portable electronic devices 105. In practice, beacon signal generating system 150 may be coupled to a power source (e.g., wall outlet), although a beacon signal generating system 150 may alternately receive power from a battery. In general, the beacon signal generating system 150 may comprise electrical components that have the capability of storing, processing and/or delivering information to another electronic device, such as the portable electronic device 105. In one embodiment, the beacon signal generating system 150 includes a conventional electronic computing device. The beacon signal generating system 150 may include non-volatile memory (not shown), a power source (not shown), input/output (I/O) devices (not shown), and a processor (not shown), as similarly discussed above. The non-volatile memory may include various data files, settings and/or parameters associated with the environment that the beacon signal generating system 150 is positioned within, information regarding the beacon signal generating system 150 itself, and in some cases information relating to one or more users of the beacon signal generating system 150. As noted above, I/O devices within the beacon signal generating system 150 may include a transceiver 155 that are configured to establish one or more different types of wired or wireless communication links 153 with other transceivers residing within other computing devices. The I/O devices may also include one or more sensors that configured to sense the interaction between a user and the beacon signal generating system 150 or the portable electronic device 105 and the beacon signal generating system 150. In some configurations, the one or more sensors may include may include motion sensing devices (e.g., accelerometers), optical sensing devices, acoustic sensing devices, touch sensing device (e.g., capacitive sensing device) or other similar sensing device.

The portable electronic device 105 can be any type of portable electronic device, such as a cell phone (e.g., smart phone), a tablet computing device, laptop computer, an e-book reader, a portable music player, or other similar electronic device. Examples of a portable electronic device 105 may include, but are not limited to an iPod®, iPhone®, iPad®, Android™ phone, Samsung phone, Samsung Galaxy®, Squeeze™ box, Microsoft Surface®, laptop or other similar device. The portable electronic device 105 may comprise a processing system 106 and memory 107, which may contain stored data 108 and one or more software applications, such as a software program 109. The processing system 106 will typically include input/output (I/O) devices 106A and a processor 106B, which may include a central processing unit (CPU), a digital signal processor (DSP), and/or application-specific integrated circuits (ASIC), and other useful components. The I/O devices 106A within the portable electronic device 105 may include a speaker 111, display device 112, a touch sensing device (not shown) and/or one or more transceivers 106C configured to establish a wired or wireless communication link with other transceivers residing within other computing devices, such as the communication links 123, 125 and 127. The I/O devices 106A within the portable electronic device 105 may also include motion sensing devices (e.g., accelerometers), magnetic field sensing devices, sound sensing devices or other useful sensors that can be used to sense the interaction of the portable electronic device 105 and the beacon signal generating system 150. The I/O devices may also include one or more timing devices, such as a clock (not shown), that are configured to provide time related information to the processor 106B within the processing system 106. The clock may be a simple IC or similar component, such as a crystal oscillator. The software applications, such as software program 109, may include software applications that are configured to run in the foreground or background on the portable electronic devices 105. The software applications are used to control one or more activities being performed by the portable electronic device 105 and/or provide some useful input to the user via audio or visual means provided by the portable electronic devices 105.

The memory 107 may be any technically feasible type of hardware unit configured to store data. For example, memory 107 could include some form of non-volatile memory, such as a hard disk, a random access memory (RAM) module, a flash memory unit, or a combination of different hardware units configured to store data. Software program 109, which is stored within the memory 107, includes program code that may be executed by processor 106B in order to perform various functionalities associated with the portable electronic devices 105.

The stored data 108 may include any type of information that relates to the configuration or control of the portable electronic device, user data, auxiliary electronic device control information (e.g., video conferencing system control commands), beacon signal generating system configuration information, useful software applications, or other useful information. In some embodiments, the stored data 108 may include information relating to one or more software applications or tasks being performed by one or more of the software applications stored with the memory 107. The stored data 108 may also include information delivered to and/or received from the beacon signal generating system 150 at various times, such as information received from a prior interaction between the portable electronic device 105 and the beacon signal generating system 150. The stored data 108 may reflect various data files, settings and/or parameters associated with the environment and/or desired behavior of the portable electronic device 105. The stored data 108 may also include data files that contain information about the user, such as biometric data, user identification information and/or any other useful information. As mentioned above, software program 109 may be used to configure the portable electronic device 105 based on stored media data 108. The software program 109 may also generate wireless control signals based on the stored data 108 and information derived from a received beacon signal.

In some embodiments, the I/O devices 106A within the portable electronic device 105 may include a wireless signal strength comparison device 106D that is adapted to detect the signal intensity of one or more wireless signals that are received by a wireless transceiver 106C in the portable electronic device 105. The signal comparison device may also include one or more analog or digital comparison circuits (e.g., OP Amps), and at least one feedback circuit that is able to provide the processor within the processing system 106 with information about the wireless signals (e.g., beacon signal) received by the beacon signal generating system 150. In one example, the wireless signal strength comparison device is able to determine the relative power levels of two or more wireless signals that have been received from two or more beacon signal generating systems, such as the beacon signal generating system 150, a second beacon signal generating system 251 (FIG. 2) and/or a third beacon signal generating system 260 (FIG. 2), which is disposed in an adjacent environment 101B, as is discussed further below. Various applications and uses of the wireless signal strength comparison device are further discussed below. In some configurations, the I/O devices 106A may also contain a display 112, a speaker 111, a microphone, navigation related components (e.g., gyroscope components, GPS components), or other desirable and useful features.

The portable electronic device 105 may also separately transmit information to and receive information from an internet connected electronic device that is also positioned within communication range of the beacon signal generating system 150 via an external communication link 123. In one configuration, the portable electronic device 105 is configured to communicate with an internet connected appliance or device via the external communication link 123 using a wireless communication technique, such as a cellular phone network, WiFi network, satellite communication network or other useful wireless communication technique. In some embodiments, the wireless transceiver 106C is configured to communicate with at least one internet device, such as a back-end server 143, without needing the communication signals to pass through communication links that pass through the firewall 102, such as communication link 123 shown in FIG. 1. In some embodiments, the one or more of the devices used to form the external communication link 123 are different from the devices used to form the communication link 121 used by the video conferencing controller 130. In one example, the external communication link 123 is formed by use of a wireless communication technique, such as a technique that uses a CDMA, GSM, LTE, HSPA+ or WiMax type wireless communication network, versus the communication link 121 that is formed between distributed secure private domains typically connected through firewall protected public access points using wired communication techniques that may include fiber, cable or DSL type data transmission methods/technologies. In another example, the external communication link 123 is formed over a WiFi network that is connected to the internet 145.

In some configurations, as is discussed further below, the internet devices found on the internet 145 may include a back-end server 143 and one or more internet hosting devices 144, which will be discussed further below. In general, the back-end server 143 can be positioned at any desired location, but is configured to communicate with one or more of the portable electronic devices (e.g., portable electronic devices 105, 165) via the separate external communication link 123.

Electronic System Configuration and Processing Sequence Examples

Figure 2:
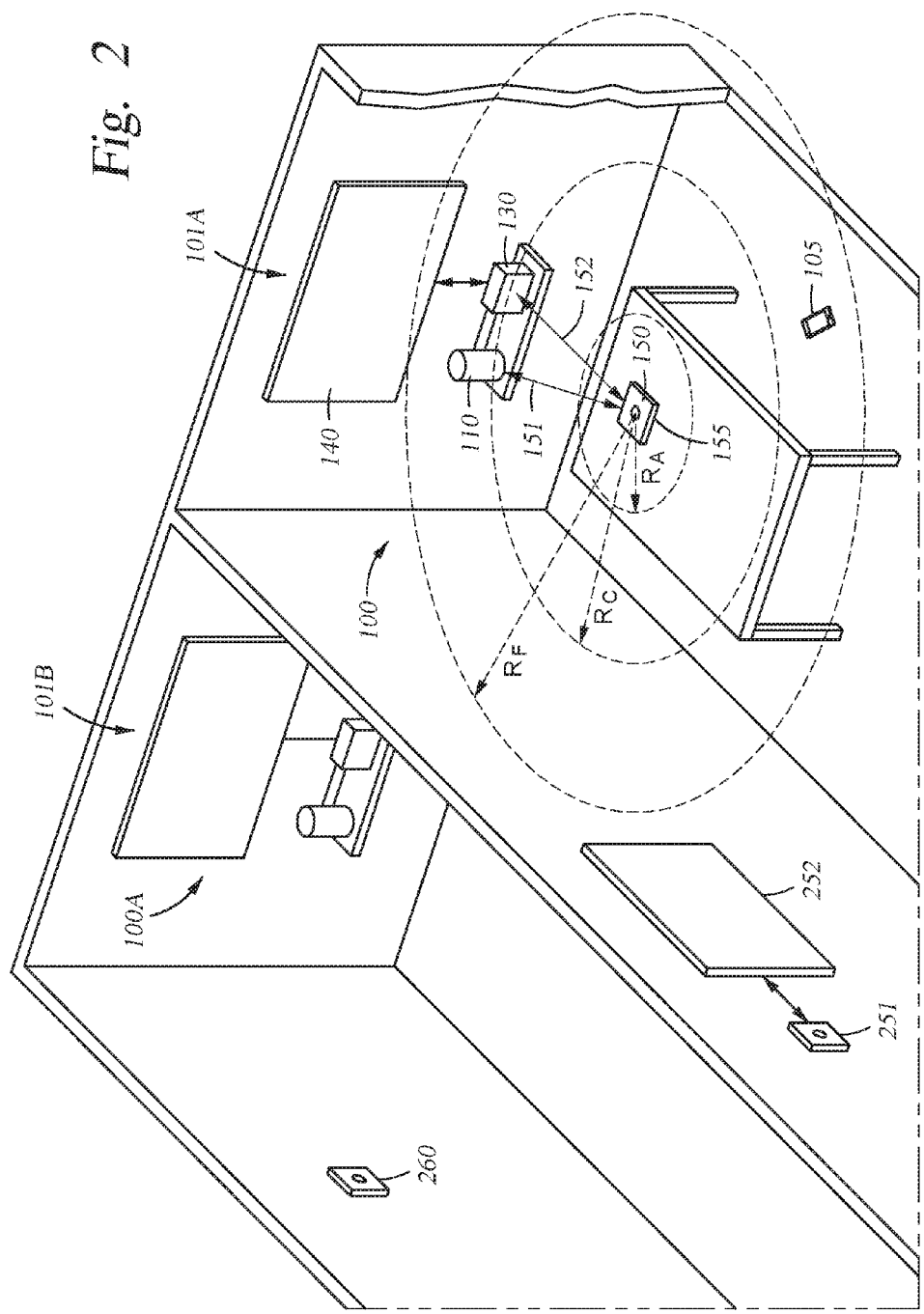
FIG. 2 illustrates multiple electronic devices that are positioned within a conference room environment, according to one embodiment of the present disclosure.
Figure 3:
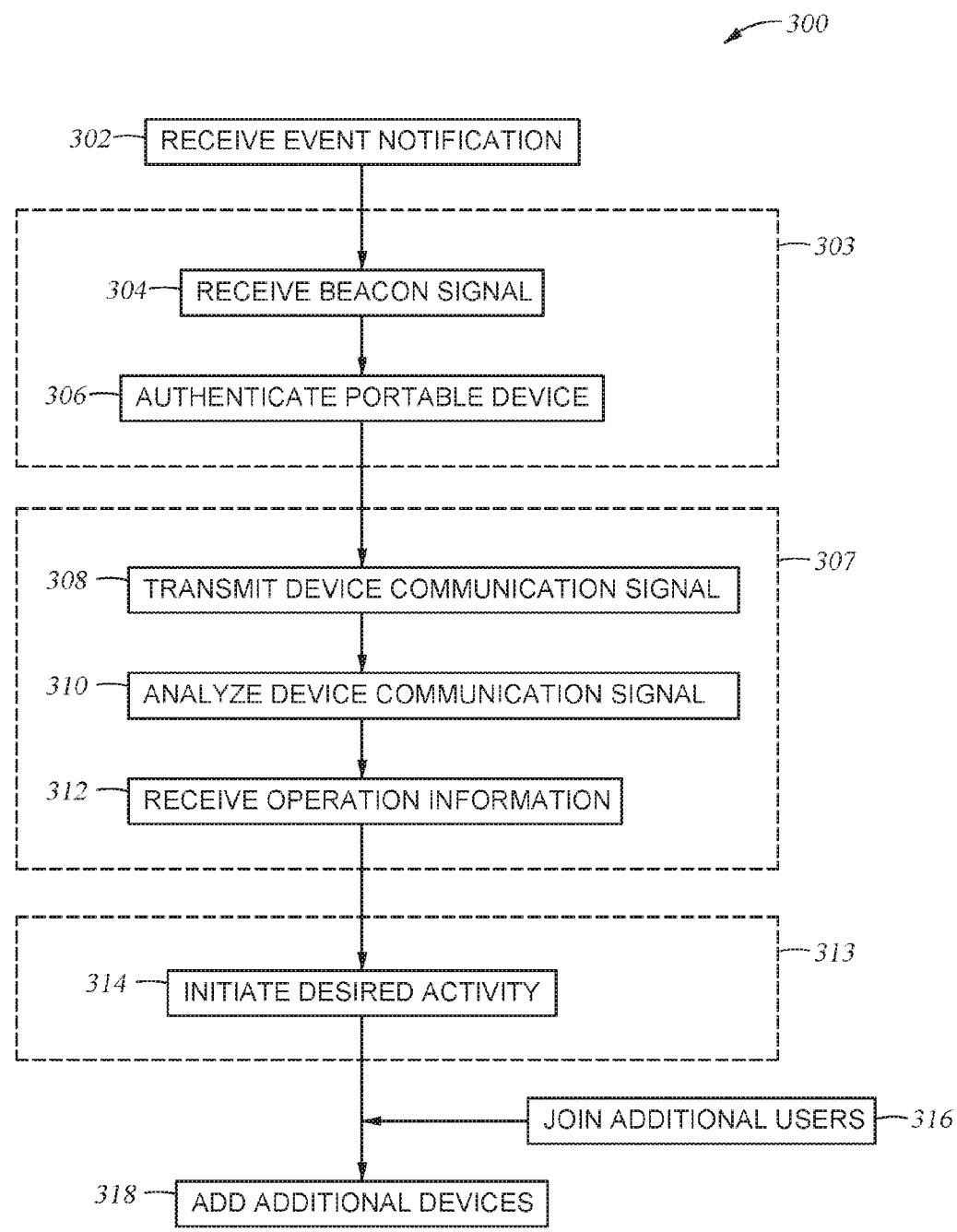
FIG. 3 illustrates a method of configuring and controlling an electronic device, according to one embodiment of the present disclosure.

FIG. 2 is a schematic diagram of a conferencing environment 101A that contains an electronic system 100 that includes a beacon signal generating system 150 that is configured to interact with one or more electronic devices, such as the portable electronic device 105. FIG. 3 illustrates a process sequence 300 for configuring and/or controlling an auxiliary electronic device based on the interaction of the portable electronic device 105 with the beacon signal generating system 150. The process sequence 300 generally includes an initiation sequence 303, an operation sequence 307 and a device control sequence 313, which are each discussed below.

The process sequence 300 may start with an optional operation 302 in which one or more of the first software applications running on the portable electronic device 105 receive input from a user or generate a prompt that a desired event is to occur. The user input or generated prompt may include the receipt of event information that is delivered to the user. In the case of the prompt, the event information can be retrieved from a memory location within the memory 107. In some cases, the prompt is generated by an event software application (i.e., first software application) that is running in the foreground or background of the portable electronic device 105, and can access the event information stored in memory. The event software application may be a calendar software application (e.g., Microsoft Outlook, Apple Calendar, Google Calendar), video conference software application (e.g., Skype, Google Hangout, Zoom Video, etc.) or other event or communication related software application. The event information may include information relating to the timing of the event, Uniform Resource Locator (URL) information that is associated with the event, or event details (e.g., location of event, attendees of the event, etc.) that are accessed by a software application, such as the calendar application running on the portable electronic device 105. In one example, URL information is supplied by the user to the first software application at a first time so that an event that occurs at a later time (e.g., second time) can use this information to access some additional event information stored on the internet 145, such as information stored on an internet device such as a back-end server 143. At the time the user input or prompt is generated by the first software application, a portion of the first software application, or a second software application that is also running on the portable electronic device 105, is configured to retrieve device configuration information that may be used to facilitate the control of the auxiliary electronic device. The device configuration information may include information that relates to attributes of the portable electronic device 105, user specific details, preferred device settings used by the user and/or other useful information. The preferred device settings may include information relating to the setup or control of the portable electronic device 105 or the auxiliary electronic device, such as a video conferencing system, a personal computer, or other useful electronic device. While the discussion below predominantly describes the use of the second software application (e.g., device control application) running on the portable electronic device 105 to perform one or more of the operations in the process sequence 300, this configuration is not intended to limiting as to the scope of the disclosure provided herein since the operations discussed herein could also be performed by portions of a single software application, such as the first software application discussed above, that have the capability of providing other useful functionalities other than performing the operations described in process sequence 300. In one example, the first software application is a conferencing software application similar to Skype, Google Hangout or Zoom Video.

The event information may also include information relating to the user, such as biometric information (e.g., facial, eye, finger, hand, DNA or saliva information) that can be used to authenticate the user and allow the user to pass one or more security checks found within the process sequence 300. For example, biometric information about the user can be used in the process of initiating and/or joining a video conference during operation 314, which is discussed further below, to assure that only desired users are allowed to enter the video conference.

As noted above, most portable electronic devices used today are a repository of a large variety of information about the user, the user's activities, biometric information about the user and/or the user's preferences that can be used within the process sequence 300 to more rapidly configure and desirably control the auxiliary electronic device, as will be discussed further below. The optional operation 302 can thus be used to collect and/or receive desired user information stored within the portable electronic device 105, which can then be used by one or more of the subsequent operations in the process sequence 300 to more easily and rapidly setup and/or control an auxiliary electronic device using the collected or received user information. The presence of the user related information stored in memory can thus reduce or prevent the need for the user to input data that already resides on the portable electronic device 105 when performing one or more of the process sequence steps described below.

Initiation Sequence

At operation 304, the initiation sequence 303 portion of the process sequence 300 starts with components in the portable electronic device 105 receiving a beacon signal from one or more beacon signal generating systems 150 that are in the communication range of the portable electronic device 105. As noted above, in some embodiments, the communication link 153, by which the portable electronic device 105 receives the beacon signal, can be a one-way communication link that doesn't require the typical pairing process that is required in most wireless communication technologies, such as Bluetooth® and others. During operation 304 a device control software application, which is running on the portable electronic device 105, is configured to receive, identify and/or parse the information received in the beacon signal to detect or determine the beacon information found therein. In some embodiments, the device control software application, or hereafter device control application, is continually running in the background of the portable electronic device 105, and is thus able to rapidly detect the receipt of the beacon signal. In other embodiments, the device control application is first initiated by input from the user, or initiated by the receipt of the event information in operation 302, so that the device control application can then detect the receipt of the beacon signal.

During operation the beacon signal can be received by the portable electronic device 105 as the portable electronic device 105 is brought into communication range of a beacon signal generating system 150. The portable electronic device 105 may be brought into communication range of a beacon signal generating system 150 as the user brings the portable electronic device 105 into an environment that contains the beacon signal generating system 150, such as the conferencing environment 101A in FIG. 2. In cases where there are multiple beacon signal generating systems, such as beacon signal generating systems 150, 251 and 260 in FIG. 2, it may be difficult for the portable electronic device 105 to determine which of the beacon signals is the correct one that is to be used going forward in the process sequence 300.

In cases where there are multiple beacon signal generating systems that are within the communication range of the portable electronic device 105, the device control application may not select the correct beacon signal and beacon information that is to be used during subsequent operations.

Thus, there is a need to determine if the device control software application has received the correct beacons signal. At operation 306, the device control software application and electrical components in the portable electronic device 105 are used to authenticate and/or determine which of the received beacon signal information should be used to perform subsequent parts of the process sequence 300. During operation 306, the device control application determines which of the received beacon signals are to be used to perform a desired activity based on the interaction with the beacon signal generating system 150. In an effort to determine which of the received beacon information should be used to perform subsequent parts of the process sequence 300, the device control application may utilize a physical interaction technique or one or more beacon signal analysis techniques.

In some embodiments, a physical interaction technique may include providing physical or non-physical (e.g., audible) input from a user to the beacon signal generating system 150, which causes the beacon signal generating system 150 to deliver a beacon signal that is received by the device control program within a desired time. In one example, beacon signal generating system 150 may include an accelerometer, microphone or touch sensing element that is able to detect an input from the user. The user thus may provide a positive input to the beacon signal generating system 150 letting it know that the user intends to interact with a specific beacon signal generating system 150. In one example, the positive input includes causing the portable electronic device 105 to come into contact with a portion of the beacon signal generating system 150. In some cases, the beacon signal generating system 150 may then use the received input from the user to generate a beacon signal at a desired time. The processor 1066 in the processing system 106 (FIG. 1) of the portable electronic device 105 may initiate a timer (time $T_0$) based on receiving and detecting the same or similar input from the user as the beacon signal generating system received. In one example, when the portable electronic device 105 is caused to contact the beacon signal generating system 150 and sensors in each device are utilized to detect the physical interaction and cause the beacon signal to be sent by electrical components in the beacon signal generating system 150 and the timer to be started by the electronic components in the portable electronic device 105. The timing function may be performed by one or more timing devices disposed within the portable electronic device 105. In general, the term "timer," as used herein, is a process that a processor uses to measure, monitor or determine that an amount of time has passed. In some examples, the timer may be a count-down timer, a count-up timer or any other method that allows the processor to determine that an amount of time has passed. Next, when the portable electronic device 105 receives the generated beacon signal at an input time $T_1$ after the timer was initiated (time $T_0$), the processor 106B will compare the difference between the input time $T_I$ and time $T_0$ for each of the received beacon signals to determine which of the beacon signals is closest in time to the reception of the input at the portable electronic device 105, and thus is the desired beacon signal to use going forward. Alternately, the time difference may be compared with the time window value stored in memory, which can be used to determine if the received beacon signal has been received within a desired time, and thus the received beacon signal is the desired beacon signal to use going forward. For example, if the timing of a detected shock or measured acceleration (e.g., "bump") of the portable electronic device 105 is in the same time frame as a detected shock or measured acceleration of the beacon signal generating system 150, then it is likely that the electronic device is positioned near the beacon signal generating system 150, and thus it is the device that the beacon signal generating system 150 is intended to communicate with going forward. The device control application and processor 106B can thus use the timing of the various received beacon signals, the initiated timer and stored time window value type information to determine which of the received beacon signals is the correct beacon signal to use going forward.

Alternately, in some cases the portable electronic device 105 may use one or more beacon signal analysis techniques to determine which of the received beacon signals is the correct beacon signal to use going forward. In some configurations, each of the beacon signal generating systems may be separately and continuously delivering beacon signals at random or regular asynchronous intervals. In some cases, the electrical components in the portable electronic device 105 are used to determine which of the multiple beacon signal generating systems is generating the desired beacon signal. In some embodiments, the electrical components may include the processor 106B, wireless signal strength comparison device 106D and memory 107. In one example, the wireless signal strength comparison device 106D may include components that are able to detect the intensity of the signals received from the multiple beacon signal generating systems that are within communication range of the portable electronic device 105. In one example, the components are able to detect the power level of the received beacon signal using a received signal strength indicator (RSSI) type technique, and determine which signal is the strongest. In another example, the signal strength comparison device 106D components are able to detect the amount of energy delivered in the beacon signal using an optical intensity measurement detector (e.g., photovoltaic device, photoresistor, thermopile, etc.) or a mechanical energy detector, such as an ultrasonic energy detector (e.g., microphone). In general, the portable electronic device 105 can be positioned at various distances from a beacon signal generating system 150 based on the position of the user relative to the beacon signal generating system 150. Therefore, in some embodiments, the wireless signal strength comparison device 106D can be used to determine the relative distance between the beacon signal generating system 150 and the portable electronic device 105, such that the device control application within the portable electronic device 105 can determine which of the received beacon signals is the correct signal to use going forward. In some embodiments, as shown in FIG. 2, the distance that the portable electronic device 105 is from the beacon signal generating system 150 can be divided into two or more regions, such as an active region $R_A$, a close region $R_C$ and a far or distant region $R_F$, which can be used by the device control application to decide what activities to perform or which beacon signal to use going forward. The various signal intensity values that are associated with the region distances from the beacon signal generating system 150, can be stored in memory so that the stored values (e.g., region signal intensity values) can be compared with collected signal intensity data to determine the relative distance and/or in which of the regions the portable electronic device 105 is positioned. The device control application can use the defined regions to determine how the portable electronic device 105 should use the received beacon information. If the portable electronic device 105 is in close proximity to the beacon signal generating system 150, such as within the active region $R_A$, the processor 106B will determine that the portable electronic device 105 is close to the beacon signal generating system 150 based on its relatively high signal intensity level and thus determine that the beacon signal generating system 150 is the desired beacon generating device versus the other beacon signal generating systems 251 or 260. In one example, the active region $R_A$ may include a space that is between about 0.5 centimeters (cm) and 1 meter (m) from the beacon signal generating system 150, such between about 1 cm and about 500 cm.

If the portable electronic device 105 is within an intermediate region (e.g., between the edge of the active region $R_A$ and the edge of the close region $R_C$), the device control application may use this information to control some aspect of the subsequent process sequence processing steps that is different than the case where the portable electronic device 105 is within the active region. In one example, the portable electronic device 105 is prevented from providing control commands to the video conferencing system 120 if it is within the close region $R_C$.

In some embodiments, the device control application can use the a signal intensity measurement technique to continually monitor the relative position of the portable electronic device 105 to the beacon signal generating system 150 so that the device control application can perform some desired function. In one example, one or more distances that the portable electronic device 105 is from the beacon signal generating system 150 can trigger the device control application to perform a desired activity, such as extracting or pre-loading data stored in memory (e.g., event information) when the portable electronic device 105 enters the distant region $R_F$ so that the portable electronic device 105 can then offer a more responsive experience when it is positioned in the active region $R_A$. In another example, the device control application can use the relative position information to end a video conference as the user is leaving the environment 101A, ask the user if they intend to leave the video conference if a change in the relative position of the portable electronic device is detected (e.g., move from the close region $R_C$ to the distant region $R_F$), or change the current presenter in the meeting by detecting a change in the relative position of the portable electronic device to the beacon signal generating system 150 (e.g., move from the close region $R_C$ to the active region $R_A$). One will note that the beacon signal generating system 150 need not be a stationary electronic device, and thus in some cases could be repositioned relative to the position of the portable electronic device 105 to alter the relationship (e.g., regions $R_A$, $R_C$, $R_F$) of one or more the portable electronic devices 105, 165 relative to the beacon signal generating system 150 in the environment 101A.

In general, the wireless signal strength comparison device 106D is configured to deliver the derived signal intensity information to the processor 106B, so that the processor 106B and device control application can make decisions regarding the type or part of the received beacon information that should be transferred in subsequent steps. The processor in the portable electronic device 105 can use the received information and compare it with information stored in its memory to help perform one or more subsequent steps. Once the correct beacon signal from the desired beacon signal generating system 150 is determined by the device control application the process sequence 300 will then continue on to the operation sequence 307.

In some embodiments, where multiple beacon signal generating systems are within the communication range of the portable electronic device 105 and multiple beacon signals are received, the device control application may generate a prompt that is displayed on the screen 112 of the portable electronic device 105 to allow the user to decide which of the beacon signals is the correct beacon signal that is to be used during subsequent operations. The user can then provide input to the portable electronic device 105 letting it know which beacon signal is to be used going forward, and the process sequence 300 can then continue onto the next operation. The input received from the user relating to a particular beacon signal can also be stored in memory for use in subsequent activities. The subsequent activities may include the next time the initiation sequence 303 and/or process sequence 300 is used by the portable electronic device 105 so that one or more processes can be completed in a shorter more expedient way the next time the initiation sequence and/or process sequence is performed, The collected user input can be stored as part of the event data stored in the memory 108 for use in subsequent operations.

During at least one of the operations performed during the initiation sequence 303 the device control application will parse the information received in a beacon signal to capture the transmitted beacon information, which is then used in one or more of the subsequent processing steps. As part of the initiation sequence 303 the device control application may analyze the beacon information and/or compare the beacon information with beacon device information stored in memory of the portable electronic device 105 to further confirm that the beacon signal was generated by the correct beacon signal generating system 150 and/or enhance the details provided in the beacon information for use in later process sequence steps. The stored beacon device information may include unique beacon signal generating system identification information, beacon signal generating system configuration information, information about the environment that the beacon signal generating system is within or other information that was created from a previous interaction of the portable electronic device 105 with the beacon signal generating system. In some cases, the detected beacon signal may cause the processor 106B to search for event information that is stored in memory 107. Thus the receipt of the beacon signal can initiate the detection of a stored event.

Operation Sequence

At operation 308, the operation sequence 307 portion of the process sequence 300 starts with components in the portable electronic device 105 using the information received from the analysis of the received beacon information (initiation sequence 303) and/or the received event information (operation 302) to determine which of the auxiliary electronic device(s) the portable electronic device 105 needs to communicate with and/or send control commands to during the subsequent device control sequence 313. In some embodiments, the received beacon information includes configuration information, such as beacon signal generating system information (e.g. beacon identification information), or location information (e.g., GPS coordinates), that is used by the portable electronic device 105 to determine which of the auxiliary electronic device(s) the portable electronic device 105 needs to communicate with during this operation. In some embodiments, the received beacon information includes information that can be used to help authenticate the portable electronic device 105 to assure that the correct user and/or device should be able to continue forward with the rest of the process sequence 300. In some cases, the received beacon information includes authentication codes that can be used in subsequent steps to authenticate the portable electronic device.

During operation 308, the device control application within the portable electronic device 105 generates one or more device communication signals based on the analysis of the received beacon information and/or the received event information. The one or more device communication signals may contain beacon information, event information and/or information derived from the analysis of the beacon information and/or event information. In one example, the device communication signal contains beacon identification information. In some embodiments, the device communication signal is transmitted to an external electronic device, and the device communication signal includes a URL string, which was contained within the event information stored within the portable electronic device 105. In some configurations, the transmitted device communication signal(s) are transmitted by the portable electronic device 105 using the wireless transceiver 106C to the external electronic device, such as the back-end server 143. The one or more device communication signals may be sent to the back-end server 143 via an outgoing signal sent by way of the external communication link 123. In an effort to reduce the need for user interaction to initiate the transmission of the device communication signal and time that would be required to transmit data securely through the firewall 102, the external communication link 123 may use devices and/or connection paths different from the devices and connection paths used to form the communication link 121. In some embodiments, the external communication link 123 includes a prior established wireless connection which is typically automatically formed in normal use by a portable electronic device, such as a CDMA, GSM, LTE, HSPA+ or WiMax type wireless communication network connection that is provided to a smartphone, tablet or other similar computing device.

At operation 310, the external electronic device, which is described hereafter as a back-end server 143, receives and processes the device communication signal(s) received from the portable electronic device 105 so that operational information can then be provided to the portable electronic device 105 from the back-end server 143 via the external communication link 123. The operational information will typically include information and/or commands that are used by the device control application running on the portable electronic device 105 to perform some subsequent operations or tasks, such as setup, configure and/or control an auxiliary electronic device. In one example, one or more software applications running on a back-end server 143 are used to analyze the received device communication signal that is then used to generate operational information that can then be used by the portable electronic device 105 to cause the setup and/or control a video conference system 120. The analysis of the information received in the device communication signal may include the detection and analysis of the beacon information and/or event information contained therein. The analysis of the received beacon information or event information can include the process of detecting information relating to the timing of the event, URL information and/or event details (e.g., location of the event, meeting room details) found within the device communication signal. In some cases, the provided beacon information is used by the software applications running on a back-end server 143 to determine and retrieve information stored within the back-end server 143 regarding a scheduled event and/or information about the beacon signal generating system 150 that is then used to form the operational information. In one example, the operational information includes specific event URL information that relates to a meeting that is currently being hosted or is going to be hosted by one of the internet connected appliances, such as one of the internet hosting devices 144. The internet hosting devices 144 may be in communication with an external electronic device 147 via a communication link 148. The external electronic device 147 can be any type of electronic device, such as an external video conferencing system which can be similar to the video conference system 120 described herein. In some embodiments, the back-end server 143 contains a library of stored information about regularly occurring events or one or more electronic system 100 components that enable the generation of the operational information that will allow the portable electronic device to perform some desired subsequent task based on the receipt of the operational information.

During the operation sequence 307, based on the receipt of device communication signals, the back-end server 143 may also initiate and perform some desired additional function based on the receipt of a device communication signal from the portable electronic device 105. Some of the desired functions may include the initiation of a video conference, sending command signals to initiate a video conference, posting desired information on the internet or performing some other useful activity.

Next, at operation 312, the back-end server 143, transmits a return communication signal, which includes the generated operational information, to the portable electronic device 105 via the external communication link 123. The device control application running on the portable electronic device 105 is used to analyze the operational information in the received return communication signal. The data generated from the analysis is then used by the device control application to provide instructions or guidance regarding which subsequent operations or tasks that are to be performed by the portable electronic device 105, such as setup, configure and/or reliably control one or more additional electronic devices. In one example, the operational information includes device identifier code information and/or other device control information relating to the supporting electronic device. In one example, an analysis of the received operational information includes the determination that the portable electronic device 105 is to communicate commands to a video conferencing system, so that a meeting can be initiated and performed by a video conferencing system. In another example, an analysis of the received operational information includes the determination that the portable electronic device 105 is to communicate commands to a home automation device, such as a Smart Home™ device from Logitech, so that a user can easily setup and/or control one or more home automation devices.

Alternately, in some embodiments of the process sequence 300, the portable electronic device 105 already has the operation information stored within the memory 107, and thus some of the processes performed in operations 308-312 can be skipped. In this case, the receipt and analysis of the beacon signal performed in operations 304-306 will cause the device control application to access the operational information that had been previously stored in the memory 107, and thus does not require the use of the back-end server 143 and related process sequence steps that require its use. The operational information may have been previously stored in the memory 107 when the event information was stored in memory 107, the device control application was initially stored within the memory 107, or received in some event information input activity or regular software update activity.

Device Control Sequence

At operation 314, the device control sequence 313 portion of the process sequence 300 starts with components in the portable electronic device 105 using information received from the analysis of the received return communication signal to determine which of the auxiliary electronic device(s) the portable electronic device 105 needs to communicate with and/or send control commands to during the device control sequence 313. In some embodiments, operation 314 includes the transmission of auxiliary device control information to an auxiliary electronic device, such as the video conference system 120. In general, the transmission of the auxiliary device control information to the auxiliary electronic device will cause one or more software applications running on the auxiliary electronic device to perform one or more desirable primary control functions or processes based on an analysis of the received auxiliary device control information. The auxiliary electronic device's primary control function is typically performed by the software applications running on the auxiliary electronic device, and may cause the auxiliary electronic device to operate in a desired way and/or to perform one or more desired tasks or activities that are in-line with its useful function. In one example, a video conferencing system's primary control function is to host a video conference in which video and audio data are transferred between two or more video conferencing locations. In another example, an electronic whiteboard's primary control function can be to collect and transmit a user's input received on a touch screen coupled to the whiteboard to a computing device. In yet another example, an audio device's (e.g., UE Boom™'s) primary control function is to deliver a desired wirelessly received audio content to user. Therefore, the one or more desired tasks or activities performed by the auxiliary electronic device may include starting-up one or more software applications stored in memory within the auxiliary electronic device or causing the auxiliary electronic device to display information contained within the auxiliary device control information. The auxiliary device control information may also provide the auxiliary electronic device with information that will allow the auxiliary electronic device to perform some desired video conferencing activities, such as initiate or enter a video conference and/or provide information that is displayed to the user on a display (e.g., display 140 (FIG. 1)) that is connected to the auxiliary electronic device. The auxiliary device control information may include commands (e.g., command instructions) that were derived and/or generated from the analysis of the operational information provided in the return communication signal sent from the back-end server 143. In some embodiments, the provided commands were specifically selected and provided from the back-end server 143 based on the information generated from the analysis of the beacon information received in the one or more device communication signals. In other embodiments, the commands and command related information are retrieved from a storage location in the memory 107 of the portable electronic device 105 based on the information generated from the analysis of the operational information provided in the return communication signal. In another embodiment, the commands and command related information is generated from an analysis of the received return communication signal and information retrieved from a storage location in memory 107 of the portable electronic device 105.

As part of operation 314, the portable electronic device 105 may perform a pairing process with the device it intends to send the auxiliary device control information to, such as an auxiliary electronic device. A pairing process is commonly performed by wireless portable devices to allow them to securely communicate with each other. In some cases, prior to transmitting the auxiliary device control information to the auxiliary electronic device, the auxiliary electronic device and the portable electronic device 105 are paired by use of the communication link formed between the wireless transceivers found in each of the devices. The signals transferred between the auxiliary electronic device and the portable electronic device 105 may contain typical Bluetooth® type pairing information, such as Bluetooth device identification (ID) information, which may be stored in memory in both the transferring and receiving devices during the pairing process. In some embodiments, the return communication signal sent from the back-end server 143 may include specific pairing information that allows the portable electronic device 105 to determine exactly which auxiliary electronic device it should communicate with within the local environment that the portable electronic device 105 is positioned (e.g., environment 101A). In other embodiments, the portable electronic device 105 may include stored prior pairing information that was generated or collected from prior pairing processes performed between the portable electronic device 105 and the auxiliary electronic device. In some embodiments, the portable electronic device 105 may perform a scan of all wireless enabled electronic devices that are within communication range, and select an electronic device to pair with based on a predetermined device priority listing saved in the memory 107 and/or information provided in the received operational information. In one example, the priority list saved in the memory is organized chronologically, such as prioritized by when each of the scanned devices last paired with the portable electronic device 105. This type of priority listing can allow the electronic device that most recently paired to the portable electronic device 105 to be selected over other resident electronic devices. The priority listing may also be organized by the most frequently used device, the type of device and/or by user input. In one example, a Bluetooth® enabled video conference camera device may have a higher priority than a Bluetooth® enabled tablet or other similar wireless enabled device. The stored prior pairing information can then be used by the portable electronic device 105 to determine the desired auxiliary electronic device to communicate with going forward.

In some cases during operation 314, the portable electronic device 105 may initiate the communication and transmit the auxiliary device control information to a specific device that was identified from information received in the operational information. In the video conferencing example, the portable electronic device 105 initiates the communication with video conference controller 130 via the communication link 125. In this example, the video conference controller 130 may then use the received auxiliary device control information to initiate and/or join a video conference via the communication link 121. In some embodiments, the auxiliary device control information may also include information about the user (e.g., biometric information) that is collected from the received beacon information or event information, and thus allow the user to pass existing security measures so that the user can join a private/secure video conference. In other embodiments, the authentication data is added to the auxiliary device control information to allow the user to pass one or more security measures so that the user can join a private and/or secure video conference. The authentication data may be derived from emails, texts, user input data or other typical communication techniques received by the portable electronic device 105 so that a user can reliably and securely prove that they are one of the users that are allowed to join the video conference.

Alternately, during operation 314, the portable electronic device 105 may initiate the communication with an auxiliary electronic device that is specifically configured to receive the transmitted auxiliary device control information delivered from the portable electronic device 105. In the video conferencing example, the portable electronic device 105 may be specifically configured to communicate with one of the video conferencing devices 110 via the communication link 127. In this example, the device control software may contain specific information that is stored within memory 107 about a video conferencing device 110 that allows the portable electronic device 105 to rapidly and seamlessly communicate with the video conferencing system 120 based on the stored information. The notification that the specific video conferencing device 110 is within the video conferencing system and is the device that is to be communicated with may be derived from the beacon information and information generated from the subsequent analyses performed by the software applications running on the back-end server 143 and the device control application running on the portable electronic device 105. In this example, the video conferencing device 110 may then deliver at least a portion of the received transmitted auxiliary device control information to the video conference controller 130 that then uses the received information to initiate and/or join a video conference via the communication link 121. The process of initiating and/or joining a video conference may include the process of initiating communication with an external video conferencing device (e.g., external electronic device 147) that is in communication with the internet hosting devices 144. The act of initiating the communication with an external video conferencing device will generally include the bi-directional transfer of electrical device information (e.g., hardware, software, and capability related information) and meeting related information between the video conference controller 130 and the external video conferencing device so that a video conference can then be automatically or semi-automatically initiated. The provided auxiliary device control information (e.g., command instructions) may also cause the video conferencing system 120 to initiate and run video conferencing software (e.g., Skype, Zoom Video), and/or enter a video conference that is being hosted by video conferencing software and other external electronic devices. The initiated video conferencing software and/or entered video conference may cause the video conferencing system 120 to display video conferencing data received via the communication link 121 on a conventional display 140. The specific event URL information that relates to the joined video conference can be provided within the auxiliary device control information.

At operation 316, one or more additional users that have separate portable electronic devices, such as a second electronic device 165, may also join the video conference event that was initiated by the processes described within operations 303, 307 and 313. The second electronic device 165 can be any type of portable electronic device, as similarly discussed above in conjunction with the portable electronic device 105, and thus may include a cell phone, tablet computing device, laptop computer, e-book reader, portable music player, electronic whiteboard, touch screen display, video projector, television, home automation component or other similar electronic device. The process of joining the video conference event can start with the second electronic device 165 also receiving event information regarding the upcoming event from one or more software applications running on the second electronic device 165, as similarly discussed above. The second electronic device 165 may then receive a beacon signal as the second electronic device 165 is brought to a position proximate to the beacon signal generating system 150 positioned within the environment 101A (FIG. 2). The process by which the second electronic device 165 receives and determines which beacon signal to use can be similar to the processes described above in conjunction with operations found within the initiation sequence 303. Using the information received from the analysis of the received beacon information (initiation sequence 303) and/or the received event information (operation 302) the device control application running on the second electronic device 165 will then transmit a device communication signal, which may contain beacon information and event information, to the back-end server 143 via the communication link 166. In general, communication link 166 may be similarly configured as the communication link 123 described above, and may follow a path that is different from the formed communication link 121. The second electronic device 165 may then receive the operational information from the back-end server 143 by use of the processes described in operation sequence 307. The second electronic device 165 may then join the video conference by use of the received operational information using the communication link 166. The provided operational information may cause the second electronic device 165 to enter a video conference hosted by other electronic devices and display video conferencing data received via the communication link 166 on a display 167 connected to the second electronic device 165. The specific event URL information that relates to the joined video conference can be provided within the operational information received from the back-end server 143. The operational information received by the second electronic device 165 need not be the same information that the portable electronic device 105 received during operation 312, and may be specifically tailored for the second electronic device 165 by the back-end server 143 based on the status of the video conference, received device communication signal and/or the capabilities of the second electronic device 165. The capabilities of the second electronic device 165 may have been determined by the back-end server 143 based on information transmitted within the device communication signal previously provided by the second electronic device 165. Therefore, based on the information found with the received operational information, the device control application running on the second electronic device 165 can then automatically setup and configure applications and hardware running on the second electronic device 165 based on the initially received beacon information. The setup and configured second electronic device 165 can then provide a user with any received information (e.g., information received from the internet 145) using the I/O devices contained within the second electronic device 165.

During operations 314-316, the transmission of the auxiliary device control information to the auxiliary electronic device may cause one or more software applications running on the auxiliary electronic device to provide or cause information to be provided to the users regarding an activity related to the primary control function of the auxiliary electronic device. In one example, the auxiliary device control information provided to a video conferencing system 120 causes the video conferencing system 120 to display information on the display 140 that lets the users know information about the video conference, such as the video conference is being initiated, the location of the conference, who is attending the video conference or other useful information.

In some cases, the one or more software applications running on the auxiliary electronic device may also provide or cause information to be provided to the back-end server 143 which then causes software applications running on the back-end server 143 to provide information to one or more additional electronic devices, such as devices that relate to the primary control function of the auxiliary electronic device (e.g., video conferencing system 120). The additional electronic devices may include devices that are positioned near to or are related to the auxiliary electronic device. The information provided by the back-end server 143 to the additional electronic device can cause the additional electronic device to provide information to a user regarding an activity that is to be performed or is being performed by the auxiliary electronic device. In one example, the auxiliary device control information provided to a video conferencing system 120 causes the video conferencing system 120 to transfer information to the back-end server 143. The back-end server 143 then sends generated operational information to a second video conferencing system that is disposed in an adjacent conferencing environment 101B so that the second video conferencing system can display information to users within the adjacent conferencing environment 101B to let them know information about the video conference that is to occur or is occurring in the next conferencing environment 101A.

One will appreciate that by use of the methods described herein, multiple users that each have a second electronic device can easily enter a video conference using the computer implemented methods described above relating to operations 303 and 307. The processes that allow additional users to enter a video conference need not require the use of event information or the need for the user to setup or configure the second electronic device, since these commands and information can be provided to the second electronic device based on the received beacon information and subsequently generated operational information that is derived from the information received within the initial beacon signal.

Additional Electronic Devices

At operation 318, optionally one or more additional electrical devices can be setup and configured to interact with the auxiliary electronic device and/or portable electronic device 105 based on the interaction of the portable electronic device 105 with a second beacon signal generating system 251. The second beacon signal generating system 251 can be similarly configured as the beacon signal generating system 150 discussed above. In one configuration, the second beacon signal generating system 251 may be associated with a second auxiliary electronic device 252 as shown in FIG. 2. The second auxiliary electronic device 252 can be any form of electronic device, such as a cell phone, tablet computing device, laptop computer, an e-book reader, a portable music player, electronic whiteboard, touch screen display, video projector, television, home automation component or other similar electronic device that may provide some useful input directly to the user, auxiliary electronic device and/or portable electronic device 105. In general, the processes performed during operation 318 will be similar to the processes performed during operations 303 and 307 described above.

During operation 318 the user may either interact with the second beacon signal generating system 251 or cause the portable electronic device 105 to interact with the second beacon signal generating system 251 in an effort to start the beacon signal authentication process. The device control software application and electrical components in the portable electronic device 105 will thus be used to authenticate and/or determine which of the subsequently received beacon signals should be used to perform the addition of the second auxiliary electronic device 252. In an effort to determine which of the received beacon signals should be used to add the second auxiliary electronic device 252, the device control application may utilize a physical interaction technique or one or more beacon signal analysis techniques, as similarly described above. In one example, a physical interaction technique may be used to authenticate the beacon signal generated by the second beacon signal generating system 251, which cause the second beacon signal generating system 251 to deliver a beacon signal that is received by the device control program within portable electronic device 105 at a desired time. In another example, as discussed above, the portable electronic device 105 may use one or more beacon signal analysis techniques to determine which of the received beacon signals is the correct beacon signal to use going forward.

As similarly discussed above, in some embodiments, when multiple beacon signal generating systems are within the communication range of the portable electronic device 105 and multiple beacon signals are received, the device control application may generate a prompt that is displayed on the screen 112 of the portable electronic device 105 to allow the user to decide which of the beacon signals is the correct beacon signal that is to be used during subsequent operations. The input received from the user relating to a particular beacon signal can then be stored in memory for use in subsequent activities, such as the next time the new beacon information generated by the second beacon signal generating system 251 is received. In some cases, the use of the stored information can allow a more automated decision to be made the next time the second beacon signal generating system's beacon signal is desirably received.

After the portable electronic device 105 has determined which of the beacon signals are to be used, the device control application within the portable electronic device 105 generates one or more device communication signals based on the analysis of the received beacon information and/or the received event information. The one or more device communication signals may contain the new beacon information generated by the second beacon signal generating system 251, event information and/or information derived from the analysis of the new beacon information and/or event information. In some embodiments, the device communication signal is wirelessly transmitted to the back-end server 143 using the external communication link 123, and includes a URL link, which was contained within the event information or beacon signal information stored within the portable electronic device 105.

Next, the back-end server 143 receives and processes the new device communication signal(s) received from the portable electronic device 105 so that a new set of operational information can then be provided to the portable electronic device 105 via the external communication link 123. The new operational information will typically include information and/or commands that are used by the device control application running on the portable electronic device 105 to setup, configure and/or control the second auxiliary electronic device 252, which, for example, may be an electronic whiteboard, video projector, touch screen or other useful electronic device.

The back-end server 143 then transmits a new return communication signal, which includes the newly generated operational information, to the portable electronic device 105 via the external communication link 123. The device control application running on the portable electronic device 105 is then used to analyze the new operational information. The data generated from the analysis is then used by the device control application to provide instructions to the portable electronic device 105 so that the second auxiliary electronic device can be setup, configured and/or controlled.

Using information received from the analysis of the new return communication signal, the portable electronic device 105 determines which auxiliary electronic device the portable electronic device 105 needs to communicate with, and/or send control commands to, based on the received return communication signal. The portable electronic device 105 will then transmit auxiliary device control information generated from the analysis of the new return communication signal to the second auxiliary electronic device 252. The auxiliary device control information provides the second auxiliary electronic device 252 with information that will allow the second auxiliary electronic device 252 to perform some desired activity, such as initiate communication with and/or transfer of information between the second auxiliary electronic device 252 and the video conference system 120 or internet 145.

As similarly discussed above, in some embodiments, the transmission of the auxiliary device control information to the second auxiliary electronic device 252 may cause one or more software applications running on the second auxiliary electronic device 252 to provide or cause information to be provided to the users regarding an activity related to the primary control function of the second auxiliary electronic device 252. In one example, the auxiliary device control information provided to an electronic whiteboard causes the electronic whiteboard to transmit information to a video conferencing system 120 that then displays information on the display 140 about the electronic whiteboard or user input provided to the electronic whiteboard. Also, in some cases, the one or more software applications running on the second auxiliary electronic device 252 may also provide or cause information to be provided to the back-end server 143 which then causes software applications running on the back-end server 143 to provide information to one or more additional electronic devices relating to the primary control function of the second auxiliary electronic device 252. In one example, the auxiliary device control information provided to an electronic whiteboard causes the electronic whiteboard to transfer information to the back-end server 143. The back-end server 143 then sends generated operational information to the video conferencing system 120 so that the video conferencing system 120 can display information to users to let them know information about the electronic whiteboard.

Therefore, by following the processes described above, one or more additional auxiliary electronic devices can be setup, configured and controlled by use of one or more beacon signal generating systems, software applications running on the portable electronic device and/or one or more software applications running on the back-end server 143. In one example, the processes described above can be used to setup a video conference device that can then provide additional data to an on-going video conference. In one example, the user causes the portable electronic device 105 to interact with an electronic whiteboard that includes a second beacon signal generating system 251 therein. Based on the interaction of the portable electronic device 105 with the second beacon signal generating system 251, the portable electronic device 105 is able to receive information from the back-end server 143, which is then provided to the electronic whiteboard to cause it to wake-up and transmit information to the video conferencing system 120 so that other attendees at other remote locations can see any subsequent input provided by the user to the electronic whiteboard on their local displays.

One will appreciate that the device control software within the portable electronic device 105 and methods provided herein do not require that the portable electronic device 105 have any prior knowledge about the auxiliary electronic device that it is intended to be setup, configured and/or controlled, since this information can be provided to the portable electronic device 105 based on the received beacon information and subsequently generated operational information that is derived from the information received within the beacon signal. Moreover, the methods provided herein do not require that the software applications (e.g., video conferencing software) running on the auxiliary electronic device have any prior knowledge of or interaction with the portable electronic device 105 prior to performing parts of the device control sequence 313. Therefore, the hardware and computer implemented methods disclosed herein need not be specially designed to work with the devices that they are to interact with during the performance of the process sequence 300, since in most cases the portable electronic device 105 need only be able to transfer the necessary auxiliary device control information to the auxiliary electronic device. Similarly, that the device control software within the second electronic device 165 and methods provided herein do not require the second electronic device 165 have any prior knowledge about the event that it is intended to attend, since this information can be provided to the second electronic device 165 based on the received beacon information and subsequently generated operational information. Therefore, many differently manufactured and/or configured electronic devices can be setup, configured and/or reliably controlled by use of the electronic system 100 described herein.

Embodiments of the disclosure may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. The computer-readable storage media will include non-volatile memory that contains computer readable instructions, such that when the computer readable instructions are executed by a processor, the processor will cause a computer implemented method to be performed.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

The invention claimed is:

1. A computer implemented method, comprising:
   receiving, at a portable electronic device, a first beacon signal;
   transmitting beacon information from the portable electronic device to a back-end server via a first communication link, wherein the beacon information is derived from an analysis of the received first beacon signal;
   receiving, by the portable electronic device, operational information from the back-end server via the first communication link, wherein the operational information is derived from information contained within the transmitted beacon information;
   analyzing the received operational information;
   transmitting auxiliary device control information to an auxiliary electronic device, wherein the auxiliary device control information comprises one or more command instructions that were at least partially derived from the analysis of the received operational information, and
   initiating, by the auxiliary electronic device, a task based on the received auxiliary device control information, wherein the initiated task includes an initiation of communication with an external video conferencing system.

2. The computer implemented method of claim 1, wherein the initiated task performed by the auxiliary electronic device further comprises automatically joining a video conference using a second communication link that is different from the first communication link.

3. The computer implemented method of claim 1, wherein the auxiliary device control information comprises a first URL that was provided in the received operational information, and the initiated task comprises automatically joining a video conference that is associated with the first URL.

4. The computer implemented method of claim 1, further comprising:
   retrieving event information from non-volatile memory within the portable electronic device,
   wherein transmitting the beacon information to the back-end server further comprises wirelessly transferring the beacon information and the event information to the back-end server, and
   wherein the operational information is derived from information contained in the beacon information and the event information.

5. The computer implemented method of claim 4, wherein the retrieved event information is determined from the analysis of the received beacon information.

6. The computer implemented method of claim 1, wherein the first communication link is a wireless communication link formed on a CDMA, GSM, LTE, HSPA+ or WiMax communication network.

7. The computer implemented method of claim 1, further comprising:
   measuring a signal intensity of the first beacon signal and a second beacon signal, wherein the second beacon signal is transmitted from a beacon generating system that is different from the beacon generating system that generated the first beacon signal;
   comparing the measured signal intensity of the first beacon signal with a region signal intensity value; and
   determining that the beacon information delivered in the first beacon signal is the beacon information that is to be wireless transmitted to the back-end serve based on the comparison.

8. The computer implemented method of claim 1, wherein the received beacon signal comprises beacon information, and wherein the beacon information comprises beacon signal generating system identification information, beacon signal generating system configuration information, or beacon signal generating system environment information.

9. The computer implemented method of claim 1, further comprising:
   retrieving the auxiliary device control information from non-volatile memory within the portable electronic device before wirelessly transmitting the auxiliary device control information to an auxiliary electronic device, wherein the retrieved auxiliary device control information is determined from the analysis of the operational information.

10. The computer implemented method of claim 1, wherein receiving the first beacon signal further comprises:
    detecting a physical interaction with a beacon signal generating system, wherein the first beacon signal is generated based on the detected physical interaction.

11. An electronic device, comprising:
    a first processor of a portable electronic device;
    a sensor that is configured to receive a beacon signal;
    a non-volatile memory having event information stored therein and a number of instructions which, when executed by the first processor, causes the portable electronic device to perform operations comprising:
    analyzing the received beacon signal;
    transmitting beacon information to a back-end server via a first communication link, wherein the beacon information is derived from the analysis of the beacon signal;
    analyzing operational information received from the back-end server via the first communication link, wherein the operational information is derived from information contained within the transmitted beacon information; and
    transmitting auxiliary device control information to an auxiliary electronic device,
    wherein the auxiliary electronic device comprises:
    a second processor; and
    a non-volatile memory having a number of instructions which, when executed by the second processor, causes the auxiliary electronic device to perform operations comprising:
    initiating a task based on the received auxiliary device control information, wherein the initiated task includes an initiation of communication with an external video conferencing system.

12. The electronic device of claim 11, wherein the initiated task performed by the auxiliary electronic device comprises automatically joining a video conference using a second communication link that is different from the first communication link.

13. The electronic device of claim 11, wherein the auxiliary device control information comprises a first URL that was provided in the received operational information, and the initiated task comprises automatically joining a video conference that is associated with the first URL.

14. The electronic device of claim 11, wherein the first communication link is a wireless communication link formed on a CDMA, GSM, LTE, HSPA+ or WiMax communication network.

15. The electronic device of claim 11, further comprising:
a wireless signal strength comparison device,
wherein the received beacon signal is a first beacon signal, and the instructions further cause the portable electronic device to perform operations comprising:
measuring a signal intensity of the first beacon signal and a second beacon signal, wherein the second beacon signal is transmitted from a beacon generating system that is different from the beacon generating system that generated the first beacon signal;
comparing the measured signal intensity of the first beacon signal with a region signal intensity value; and
determining that the beacon information delivered in the first beacon signal is the beacon information that is to be wireless transmitted to the back-end serve based on the comparison.

16. The electronic device of claim 11, wherein the received beacon signal comprises beacon information, and wherein beacon information comprises beacon signal generating system identification information, beacon signal generating system configuration information, or beacon signal generating system environment information.

17. The electronic device of claim 11, wherein the instructions further cause the portable electronic device to perform operations comprising:
retrieving event information that is stored in the non-volatile memory, wherein the event information that is retrieved from the non-volatile memory is determined from the analysis of the received beacon information, wherein wirelessly transmitting the beacon information to the back-end server further comprises wirelessly transferring the event information to the back-end server, and the operational information is also derived from information contained in the event information.

18. The electronic device of claim 11, further comprising retrieving the auxiliary device control information from the non-volatile memory before wirelessly transmitting the auxiliary device control information to an auxiliary electronic device, wherein the auxiliary device control information that is retrieved from the non-volatile memory is determined from the analysis of the operational information.

19. A system for automatically configuring an electronic device, comprising:
a first beacon generation system, comprising:
a first processor;
non-volatile memory having beacon information stored therein; and
a transceiver that is configured to wirelessly transmit a beacon signal that comprises beacon information;
a first portable electronic device, comprising:
a second processor;
a transceiver that is configured to receive the beacon signal from the first beacon generation system; and
non-volatile memory having event information stored therein and a number of instructions which, when executed by the second processor, causes the first portable electronic device to perform operations comprising:
analyzing the beacon signal received from the transceiver;
transmitting beacon information to a back-end server via a first communication link, wherein the beacon information is derived from the analysis of the beacon signal;
analyzing operational information received from the back-end server via the first communication link, wherein the operational information is at least partially derived from information contained within the transmitted beacon information;
retrieving auxiliary device control information from the non-volatile memory based on the analysis of the received operational information; and
transmitting the auxiliary device control information to an auxiliary electronic device; and
the back-end server further comprising:
a third processor;
a transceiver that is configured to receive a device communication signal from the first portable electronic device and transmit operational information to the first portable electronic device; and
non-volatile memory having stored therein and a number of instructions which, when executed by the third processor, causes the back-end server to perform operations comprising:
analyzing the beacon information received from the first portable electronic device via the first communication link; and
transmitting operational information to the first portable electronic device via the first communication link, wherein the operational information is at least partially derived from the analysis of the received beacon information.

* * * * *